Patented May 20, 1941

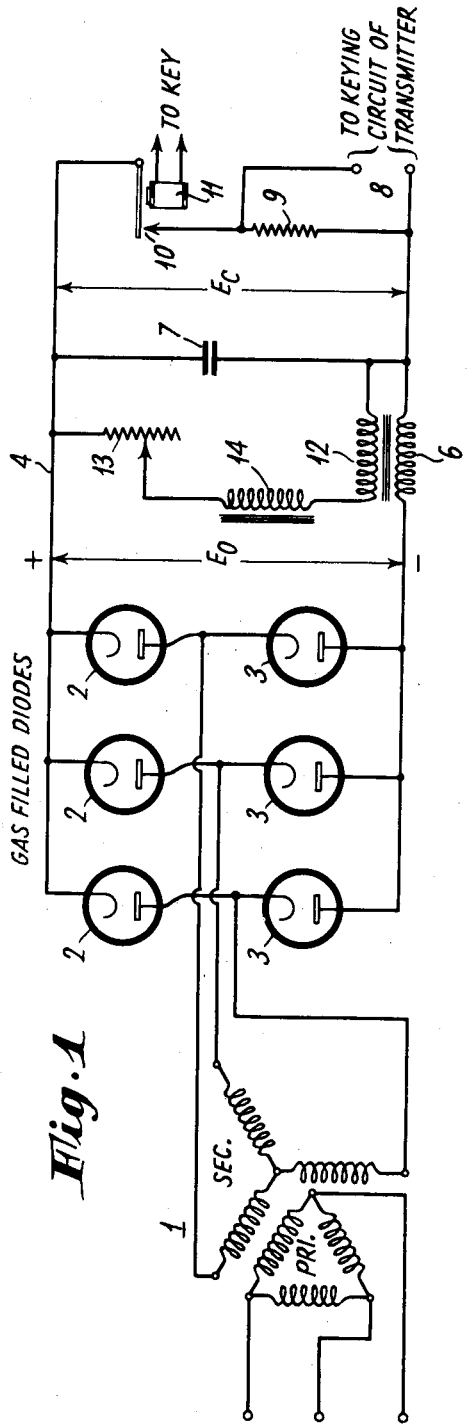

2,242,881

UNITED STATES PATENT OFFICE 2,242,881

RECTIFIER FILTER

James L. Finch, Patchogue, and George L. Usselman, Port Jefferson, N. Y., assignors to Radio Corporation of America, a corporation of Delaware Application April 27, 1938, Serial No. 204,586

5 Claims. (Cl. 178—44)

This invention relates to rectifier filters whereby the alternating components of voltage which may be present in a direct current power source driven by an alternating current source are prevented from being impressed upon the load or are reduced to an insignificant value.

The invention has particular application to the combination of a rectifier system and a filter adapted to feed current to a variable load. A more specific application is in connection with a rectifier using gas-filled tubes. Such a rectifier delivers pulsating or fluctuating uni-directional voltages. A filter is generally used to smooth these fluctuations. The object of the filter is to suppress as far as possible the alternating components. With rectifiers employing gas-filled tubes it has been found desirable to utilize a reactor which limits the instantaneous value of current in the rectifier tubes to a value which will not dangerously overload such tubes.

Our invention has been designed with particular reference to its utility in telegraph transmitters where it is necessary that the output current of the power source vary with the telegraphic signals between a no load value and a full load value. This requires that the alternating components of current must pass through a filter of somewhat unusual design. If an ordinary filter were to be used, difficulties would arise in attempts to suppress the alternating components on the one hand, while suitably adapting the power source to supply at one instant a heavy current and at the next instant substantially no current. Heretofore it has been found very difficult to meet these requirements.

It is among the objects of our invention to provide a rectifier and filter system which is suitable for delivering a substantially constant direct current during the marking intervals of telegraph signalling and to provide compensation for the characteristics of the rectifier filter system which would enable it to properly function despite rapid changes in the load conditions incident to the keying of a telegraph circuit. Other objects and advantages of our invention will be made manifest in the description to follow.

The invention itself will now be described by reference to the accompanying drawing in which, Figure 1 shows a circuit diagram of a rectifier filter system embodying the features of our invention;

Fig. 2 shows a graphic chart of voltages plotted against time for illustrating conditions obtained in an ordinary rectifier filter and how certain undesirable characteristics may be eliminated; and Fig. 3 shows graphically the characteristics of one of the components of our novel rectifier-filter system.

Referring first to Fig. 1, we show, by way of example, the use of a poly-phase transformer 1, the secondary terminals of which lead to a gaseous discharge tube rectifier system consisting for example, of three pairs of gaseous discharge tubes 2, 3. Each of these tubes is here shown as a diode rectifier having merely a cathode and an anode. Other types of tubes may, however, be used, if desired. Each of the conductors from the several windings of the secondary in the transformer 1 is connected to an appropriate conductor between the anode of a tube 2 and the cathode of a tube 3. The cathodes of the tubes 2 are interconnected and feed a positive potential to the line 4. The anodes of the tubes 3 are also interconnected and feed negative potential to the line 5. Across the conductors 4, 5, therefore, a certain voltage $E_0$ exists which naturally possesses a ripple component. It is important that this ripple component shall be smoothed out as far as possible if the D. C. power source is to be utilized in a radio telegraph transmitting system.

Heretofore it has been the practice to utilize a reactor 6 for smoothing out the ripple component. The value of this reactor was so chosen that in conjunction with the value of a capacitor 7 the peak current rating of the rectifier tubes would not be exceeded.

For the purpose of illustrating the conditions as they existed in a conventional filter system prior to the use of our invention, we show in Fig. 2 a characteristic curve of voltages impressed upon a load when such voltages are plotted against time. It is here assumed that the load represented at 8 and including resistor 9 is connected and disconnected by the keying relay 10—11 under control of a telegraph key.

Prior to the closing of the relay contacts 10 there is a certain charge placed upon the capacitor 7 equivalent to the voltage $E_0$ as delivered by the rectifier tubes 2, 3. Instantly upon closing the contacts 10 of the relay 11 the voltage $E_c$ is impressed upon the load 8, 9. The current drawn through this load discharges the capacitor 7 causing its voltage to drop sharply. This voltage would continue to drop along the dotted line G of Fig. 2 were it not for the fact that the rectifier begins to supply current to maintain the voltage. This current must be supplied through the reactor 6 and it, therefore, tends to build up the voltage in accordance with dotted line F (Fig. 2). These two effects combine to give a voltage as shown by the full line $E_r$. This curve $E_r$ has a valley between the moments A and B and a second peak value at B. Between the moments B and C the voltage is practically constant except for the slight alternating current component which the filter 6, 7 allows to pass. The initial high peak voltage at A is undesirable, but even according to the prior art it can be somewhat suppressed. So far as is known to us, however, it was not heretofore possible to remove the undesirable dip in the voltage curve between the moments A and B. We shall now show how this difficulty has been overcome when practicing our invention.

The reactor 6 has been made a primary winding of a transformer whose secondary is shown at 12. This secondary winding 12 is supplied with direct current from the output of the rectifier through a rheostat 13 and reactor 14. The direct current in the winding 12 could be supplied from any other convenient source, if desired.

The reactive winding 14 is employed to prevent variations in the current due to the induced voltage from the winding 6. The current in the winding 12 is of such value that the ampere turns are equivalent to O—X as plotted in Fig. 3. This value is determined by the setting of the rheostat 13. The relative direction of the currents in the windings 6 and 12 is such that their flux is in opposite directions. The current in the winding 6 gives ampere turns equivalent to X—Y (Fig. 3) so that the resultant ampere turns on the core have a value equivalent to O—Y. They are so adjusted that O—Y falls at the knee of the curve which is the saturation point, when the current in the winding 6 equals the maximum allowable rectifier current.

The operation of our invention will be best understood by considering first the condition which obtains when the keying relay contacts 10 are open. At this time the current output of the rectifier is only a small percent of its rating. Thus the voltage on the capacitor 7 will assume a value nearly equal to the peak voltage of the rectifier, namely, $E_o$. During the time intervals when $E_o$ is less than the voltage $E_c$ across the capacitor 7, no current will flow from the rectifier through the transformer winding 6. However, at the instant when $E_o$ exceeds $E_c$ a current will flow to the capacitor 7 through the winding 6 which would tend to have a value proportional to the rate of increase of $E_o$ and the value of the capacitor 7. Since the core of the transformer 6, 12 is saturated it will have only a slight effect in decreasing this value of the current. However, as soon as the current in the winding 6 has risen to the value X—Y (Fig. 3), the flux in the core will be reduced to the saturation point and its inductance will be greatly increased.

Now, if the current in the winding 6 tends to increase further, the reactance will set up a counter voltage which prevents this increase. Thus, the current will remain at this value which, as originally assumed, is equal to the allowable current to be derived from the rectifier. This current will remain essentially constant as long as $E_o$ exceeds $E_c$. When $E_o$ becomes less than $E_c$ the current will tend to drop to zero but the reactance of the winding 6 will produce a voltage, due to this tendency for the current to change, which will add to the voltage $E_o$ during a short interval of time so that the current will not actually drop to zero at once. This process is repeated for each pulsation of the ripple component in the voltage $E_o$.

Due to the fact that the voltage $E_o$ exceeds $E_c$ during only a small percent of the time, current is delivered by the rectifier only a very small percent of the time. The total quantity of electricity flowing from the rectifier in this case can only be equal to that required by the filter circuit 13, 14 and 12.

Now let it be assumed that the relay contacts 10 are closed. The current in the load 8, 9 may be assumed to equal the full load output of the rectifier. In order that this full load output may be maintained, the voltage on the capacitor 7 will have to be decreased somewhat. This will make the value of $E_o$ exceed $E_c$ for a much greater percent of the time than formerly. By the action described above the current delivered by the rectifier will equal its maximum allowable output during the time that $E_o$ is greater than $E_c$, and since this time has greatly increased, the output of the rectifier is increased correspondingly and will meet the requirements of the load. It is seen from the above that at the instant when the relay contacts 10 are closed there will be a sharp decrease in voltage impressed upon the load as compared with the no load value, but the voltage drop will not fall below the full load value.

In addition to the accomplishment of smoothing out the voltage curve $E_r$ of Fig. 2 so that the dip between the moments A and B is substantially eliminated, it is possible by the addition of parts well known by those skilled in the art to practically eliminate the initial peak voltage at the moment A. This may be accomplished, however, without limiting the current supplied suddenly to the load in accordance with the load requirements. Various modifications and changes in the circuit arrangements will be understood to fall within the scope of the invention. In fact, various rectifier arrangements are, of course, useful and various types of filters may be used. The essence of the invention itself resides to a large extent in the circuit arrangement which includes the elements 12, 13 and 14 in combination with any suitable rectifier-filter designed to operate in the manner set forth. The scope of the invention is, therefore, limited only in accordance with the claims.

We claim:

1. In a rectifier-filter circuit arrangement for supplying direct current to a variable load, a capacitor connected across the output leads from said filter, a magnetic-core transformer having a series winding connected between said rectifier and said load and an opposing winding connected in parallel to said capacitor, and means including impedances having inductance and ohmic resistance in series with said opposing winding, whereby the core of said transformer is caused to be saturated when substantially no current traverses said series winding.

2. The combination as defined by claim 1 and including means for varying the magnetic flux in said transformer between unsaturated and saturated values in dependence upon current variations in that one of said transformer windings which is in series with the load.

3. A filter system for use with a power supply unit having gaseous rectifier tubes, said filter system comprising a capacitor in shunt with a load circuit of variable resistance value, said filter system comprising also a series inductive element which possesses a magnetic core, a second inductive element coupled to said series inductive element, an inductive and resistive circuit in series with the second inductive element and in parallel with said capacitor, and means for so adjusting the current flow in said second inductive element as to obtain core saturation when no current flows in said series-inductive element.

4. In combination, an alternating current power supply source having rectification means fed therefrom; a filter system connected to output leads from said means and including a capacitor in shunt with a resistive and inductive circuit, and a transformer having mutually coupled windings; and a load adapted to be intermittently connected through one of said windings to said rectification means; the other of said windings constituting at least part of said resistive and inductive circuit; and said filter system being characterized in that the core of said transformer becomes substantially saturated under no-load conditions.

5. The combination according to claim 4 and including means for cutting said load in and out of circuit.

JAMES L. FINCH.
GEORGE L. USSELMAN.